United States Patent Office 3,065,209
Patented Nov. 20, 1962

3,065,209
RESINS FROM 1,2,5,6-DIEPOXYCYCLOOCTANE
Frederick C. Frostick, Jr., and Benjamin Phillips, both of Charleston, W. Va., assignors to Union Carbide Corporation, a corporation of New York
No Drawing. Filed Oct. 12, 1961, Ser. No. 144,575
2 Claims. (Cl. 260—78.4)

This invention relates to 1,2,5,6-diepoxycylooctane, and to compositions and resinous products obtained therefrom. The diepoxide of this invention is of particular interest in the plastics and resins industry and is particularly adapted for use in the preparation of resinous products by reaction with difunctional organic chemical compounds such as diamines, dialdehydes, dicarboxylic acids, diols and the like. The resinous products thus produced can then be formed into useful articles or employed in electrical applications as potting compositions. Furthermore, the diepoxides of this invention will react with adipic acid to form flexible, thermoplastic resins. Consequently, this diepoxide, in admixture with adipic acid, provides compositions which are particularly desirable for use in coating applications wherein flexible, thermoplastic surface coatings are desired. In addition, 1,2,5,6,-diepoxycylooctane is also useful as a stabilizer for vinyl chloride resins.

The 1,2,5,6-diepoxycyclooctane of this invention can be represented graphically by the following general formula:

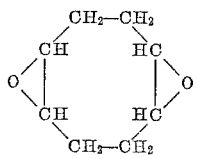

The preparation of the diepoxide is carried out by reacting 1,5-cyclooctadiene and at least 2 moles of peracetic acid, per mole of 1,5-cyclooctadiene. The reaction of 1,5-cyclooctadiene and peracetic acid is preferably carried out by the addition of an excess amount of peracetic acid to the 1,5-cyclooctadiene at temperatures in the range of from $-25°$ C. to about $150°$ C. and preferably in the range of from $0°$ C. to $45°$ C. The reaction is exothermic and external cooling can be applied, if desired, to maintain the desired temperature and to assure a reasonable reaction rate. The reaction is allowed to proceed until an analysis of a sample of the reaction mixture indicates that the theoretical amount of peracetic acid has been consumed. The product is recovered from the reaction mixture by separation of the unreacted peracetic acid under any suitable conditions which will not destroy the epoxide groups. Preferred methods for recovering 1,2,5,6-diepoxycyclooctane from the reaction mixture include extraction, continuous distillation and distillation under reduced pressures.

In formulating compositions of 1,2,5,6-diepoxycyclooctane with adipic acid sufficient acid is admixed with the 1,2,5,6-diepoxycyclooctane so as to provide a composition containing from about 0.5 to about 1.2 carboxyl groups per epoxy group. Heating the compositions, so formulated, at elevated temperatures, generally on the order of about $120°$ C. to about $160°$ C. for a period of time of about 5 to about 15 hours will result in the production of a resinous product which is flexible and thermoplastic. The exact heating cycle will depend, of course, on the particular composition being heated. The following examples illustrate the present invention and are not intended to limit the scope thereof in any manner.

EXAMPLE 1

*Preparation of 1,2,5,6-Diepoxycyclooctane*

1,5,-cyclooctadiene (25 grams, 0.231 mole) was placed in a flask fitted with a stirrer and external cooling, and 188 grams of a 23.4% solution of peracetic acid in ethyl acetate (44 grams, 0.578 mole of peracetic acid) was added dropwise over a period of twenty-five minutes. During the addition and for two hours thereafter, the reaction solution was maintained at a temperature of $35°$ C. At the end of this period, an analysis for peracetic acid indicated that 97.8% of the theoretical amount of peracetic acid has been consumed.

The reaction solution was then added dropwise to a still kettle containing ethylbenzene refluxing at 25 mm. pressure. During the addition, there was distilled at the head enough material so that a head temperature of $30°$ C. to $32°$ C. was maintained. After addition, a low-boiling material was distilled up to the boiling point of pure ethylbenzene. There remained 72 grams of residue product which analyzed 0.14% as acetic acid. The residue product was fractionated through a ten-inch column packed with glass helixes, and there was obtained 27 grams of 1,2,5,6-diepoxycyclooctane which represented an 84.0% yield. The product, 1,2,5,6-diepoxycyclooctane was characterized and had the following physical properties:

Boiling Point=$92°$ C.–$93°$ C. (4 mm. Hg)
Refractive Index, $n_D^{30}$=1.4935
Analysis=Calculated for $C_8H_{12}O_2$

| | Theoretical | Found |
|---|---|---|
| C percent | 68.54 | 68.40 |
| H percent | 8.63 | 8.77 |

EXAMPLE 2

This example illustrates the new and totally unexpected properties possessed by the diepoxide of this invention.

Two compositions were prepared, Composition A which was based on 1,2,5,6-diepoxycyclooctane; and Control 1, which was based on 1,2,4,5-diepoxycyclohexane. Formulation of each composition, the heating cycle to which each composition was subjected and the properties of each composition are noted below.

| | Control 1 | Composition A |
|---|---|---|
| 1,2,4,5-diepoxycyclohexane_____grams__ | 0.6 | |
| 1,2,5,6-diepoxycyclooctane_____do____ | | 0.7 |
| adipic acid_____do____ | 0.37 | 0.37 |
| carboxyl group per epoxy group_____ | 0.6 to 1 | 0.6 to 1 |

Each composition was subjected to the following heating cycle: seven hours at a temperature of $120°$ C., and then six hours at a temperature of $160°$ C.

At the end of the heating cycle, the product obtained from Control 1 was yellow in color and was a tough, infusible thermoset resin which had a Barcol hardness of 57, determined using a Barcol Impressor GYZJ 934–1.

At the end of the same heating cycle, the product obtained from Composition A was a soft, flexible, thermoplastic resin which melted, when heated to a temperature of $160°$ C.

This application is a continuation in part of our co-pending application, Serial No. 527,424, filed August 9, 1955 and entitled 1,2,5,6-Diepoxycyclooctane and Process for the Preparation Thereof.

What is claimed is:
1. A composition comprising 1,2,5,6-diepoxycyclooctane and adipic acid, said adipic acid being present in said composition in an amount to provide from about 0.5 to about 1.2 carboxyl groups per epoxy group.

2. The thermoplastic resin obtained from the composition defined in claim 1.

References Cited in the file of this patent

UNITED STATES PATENTS

| 2,571,208 | Craig | Oct. 16, 1951 |
| 2,739,161 | Carlson | Mar. 20, 1956 |
| 2,745,847 | Phillips et al. | May 15, 1956 |
| 2,750,395 | Phillips et al. | June 12, 1956 |
| 2,786,067 | Frostick et al. | Mar. 19, 1957 |
| 2,801,232 | Suen et al | July 30, 1957 |
| 2,890,197 | Phillips et al. | June 9, 1959 |

FOREIGN PATENTS

| 520,163 | Great Britain | Apr. 16, 1940 |
| 549,916 | Belguim | Aug. 14, 1956 |

OTHER REFERENCES

Godchot: Comptes Rendus, v. 192, pp. 962–964 (1931).

Bedos: Comptes Rendus, v. 195, pp. 802–804 (1932).

Richter: Textbook of Organic Chemistry (1952), pp. 20–21 (Wiley).

Organic Reactions, vol. VII, pp. 402–404 (1953), Wiley.

Webster's New International Dictionary, 2nd Ed. (1939), pp. 1194.

Richter: Chemistry of the Carbon Compounds (Alicyclic) vol. 2, page 1 (3rd Ed., 1939).

Richter: Chemistry of the Carbon Compounds, vol. 4, pp. 4–5 (1947).

Fieser and Fieser: Organic Chemistry (3rd Ed., 1956), pp. 46–47. (Copy available in U.S. Patent Office Sci. Lib.)